(12) United States Patent
Byren

(10) Patent No.: US 7,439,482 B2
(45) Date of Patent: Oct. 21, 2008

(54) AUTOMATIC AVALANCHE PHOTODIODE BIAS SETTING SYSTEM BASED ON UNITY-GAIN NOISE MEASUREMENT

(75) Inventor: Robert W. Byren, Manhattan Beach, CA (US)

(73) Assignee: Raytheon Company, Waltham, MA (US)

(*) Notice: Subject to any disclaimer, the term of this patent is extended or adjusted under 35 U.S.C. 154(b) by 148 days.

(21) Appl. No.: 11/489,000

(22) Filed: Jul. 19, 2006

(65) Prior Publication Data

US 2008/0017785 A1 Jan. 24, 2008

(51) Int. Cl.
*H01L 31/00* (2006.01)

(52) U.S. Cl. ............... 250/214.1; 250/214 R; 257/603

(58) Field of Classification Search ........... 250/214.1, 250/214 R, 214 AG, 214 DC; 330/308; 257/603–606
See application file for complete search history.

(56) References Cited

U.S. PATENT DOCUMENTS

| 4,181,863 | A |   | 1/1980  | Parker |
|-----------|---|---|---------|--------|
| 4,236,069 | A |   | 11/1980 | Laughlin |
| 4,730,128 | A |   | 3/1988  | Seki |
| 5,696,657 | A |   | 12/1997 | Nourrcier et al. |
| 5,929,982 | A | * | 7/1999  | Anderson .......... 356/73.1 |
| 6,157,022 | A |   | 12/2000 | Maeda et al. |
| 6,222,660 | B1|   | 4/2001  | Traa |
| 6,654,215 | B2|   | 11/2003 | Green |
| 6,858,829 | B2|   | 2/2005  | Nishimura et al. |
| 6,858,912 | B2|   | 2/2005  | Marshall et al. |
| 2004/0264982 | A1 | | 12/2004 | Harres |
| 2005/0205759 | A1 | | 9/2005  | Wang |

FOREIGN PATENT DOCUMENTS

EP 0856943 A 8/1998

OTHER PUBLICATIONS

R.J.McIntyre, Multiplication Noise in Uniform Avalanche Diodes, IEEE Transactions on Electron Devices ED-13(1), 164-168 (1966).
R.W.Byren, "The Infrared and Electro-Optical Systems Handbook, vol. 6, J. Accetta and D. Shumaker exec. ed., C. Fox ed., Infrared Information Analysis Center and SPIE," Chapter 2, Laser Rangefinders, 1993, pp. 77, 90-92.

* cited by examiner

*Primary Examiner*—Georgia Y. Epps
*Assistant Examiner*—Francis M Legasse, Jr.
(74) *Attorney, Agent, or Firm*—Leonard A. Alkov

(57) ABSTRACT

A system for setting the bias of a device. The novel bias setting system includes a first system for determining a ratio between noise at an operating gain of the device and noise at a reference gain of the device, and a second system for adjusting the bias until that ratio is equal to a predetermined factor Z. The reference gain is the unity gain or reach-through gain of the device. In an illustrative embodiment, the first system is adapted to measure the noise at operating gain by determining an operating gain threshold, and measure the noise at the reference gain by determining a reference gain threshold. The second system then adjusts the bias until the ratio of the operating gain threshold to the reference gain threshold is equal to the predetermined factor Z.

23 Claims, 4 Drawing Sheets

AUTOMATIC AVALANCHE PHOTODIODE BIAS SETTING SYSTEM BASED ON UNITY-GAIN NOISE MEASUREMENT

BACKGROUND OF THE INVENTION

1. Field of the Invention

The present invention relates to electro-optical systems. More specifically, the present invention relates to biasing circuits for avalanche photodiodes.

2. Description of the Related Art

Photodiodes are p-n junction semiconductor diodes that are sensitive to electromagnetic radiation through a photovoltaic process. Incident photons with photon energies greater than the bandgap energy of the semiconductor can generate electron-hole pairs within the depletion layer of the diode, which drift under the influence of a reverse bias, generating a current that is added to the normal leakage current of the diode. Avalanche photodiodes (APDs) are operated at a sufficiently high reverse bias that the drift field within the semiconductor accelerates the photo-carriers, causing avalanche multiplication of the photocurrent through multiple impact ionizations.

The gain of an APD is the net increase in the number of signal carriers generated through this avalanche multiplication process. Avalanche multiplication is inherently noisy, as both minority and majority carriers contribute to the noise current, while only minority carriers contribute to the signal current. A problem associated with APDs is that as the background noise level varies, the optimum gain value varies. To maximize the sensitivity of an APD receiver, it is necessary to bias the APD devices at a reverse-bias voltage that optimizes the gain for lowest noise equivalent power (NEP) in the presence of solar and/or thermal background Shot noise, detector Shot noise due to detector leakage or dark current, and preamplifier Johnson or thermal noise.

Many approaches are known in the art for setting the bias of an APD detector. Some teach setting a fixed threshold, which provides no optimization for changes in temperature or noise level. Others teach methods for measuring the temperature and adjusting the bias according to a known gain vs. temperature characteristic, which are an improvement over the fixed bias approaches, but do not optimize the gain based on the ambient noise conditions. Others set the bias at a voltage that is a fixed fraction of the breakdown voltage or a fixed value below the breakdown voltage with similar results, but with the added risk of damage due to excessive detector current draw when the breakdown voltage is measured.

U.S. Pat. No. 4,236,069 entitled "AVALANCHE PHOTODIODE GAIN CONTROL SYSTEM" by Laughlin, appears to use an ambient noise measurement in the bias setting approach. Laughlin purports to teach an APD bias circuit that controls APD gain such that the output noise level of the APD device matches the preamplifier noise level with no APD device noise. This is a further improvement over the prior approaches inasmuch as it adjusts to varying noise levels. The Laughlin approach, however, is complex in its implementation, requiring a complicated preamplifier noise measurement circuit, and is not optimum across the range of detector types and anticipated noise conditions.

Hence, a need exists in the art for an improved system or method for setting the bias of an avalanche photodiode that optimizes signal-to-noise ratio over a broad range of detector types and noise conditions.

SUMMARY OF THE INVENTION

The need in the art is addressed by the system for setting the bias of a device of the present invention. The novel bias setting system includes a first system for determining a ratio between noise at an operating gain of the device and noise at a reference gain of the device, and a second system for adjusting the bias until that ratio is equal to a predetermined factor Z, which is defined herein as the reference total noise ratio. The reference gain is the unity gain or reach-through gain of the device, and the predetermined factor Z is a function of the device type that is chosen to optimize the gain of the device over a broad range of noise conditions.

In an illustrative embodiment, the first system is adapted to measure the noise at the reference gain by determining a reference gain threshold such that the number of times m that the device output crosses the threshold over a predetermined number of trials n is approximately equal to a predetermined fraction of the number n. The first system also measures the noise at an operating gain by determining an operating gain threshold in a similar manner. The second system then adjusts the bias until the ratio of the operating gain threshold to the reference gain threshold is equal to the predetermined factor Z.

DESCRIPTION OF THE INVENTION

Figure 1:
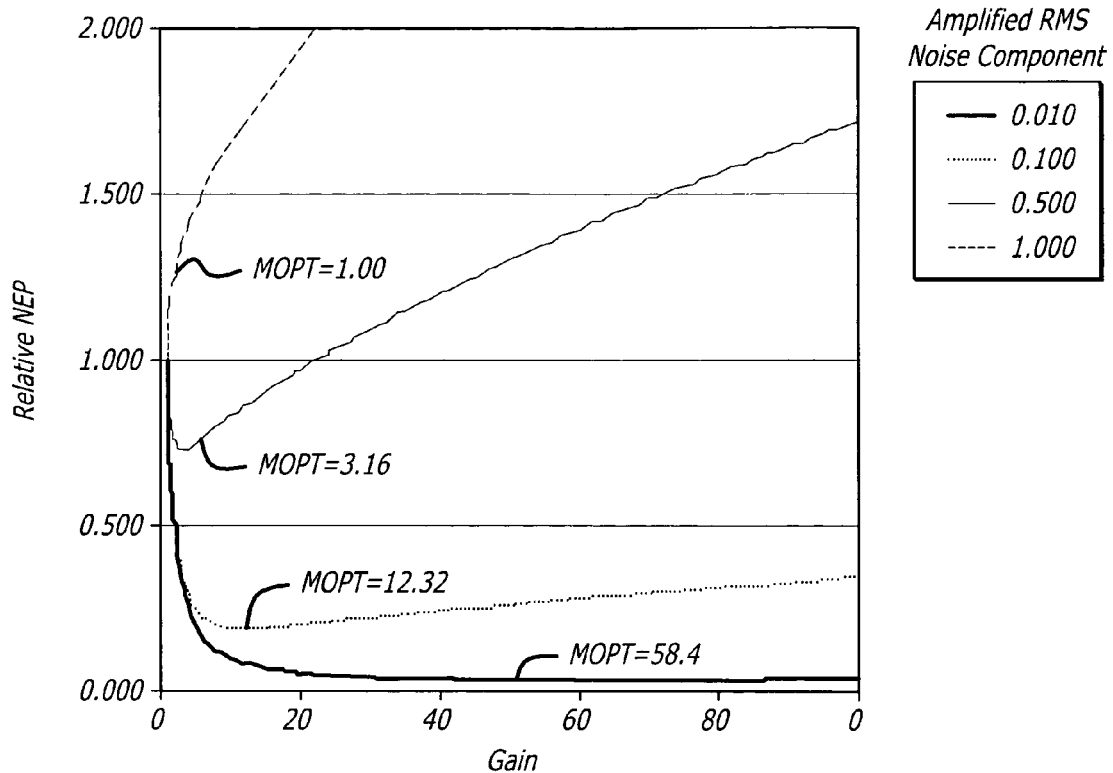
FIG. 1 is a graph of relative noise equivalent power as a function of gain M for three different noise conditions given a specific detector type.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The gain of an avalanche photodiode (APD) is the net increase in the number of signal carriers generated through this avalanche multiplication process. Avalanche multiplication is inherently noisy, as both minority and majority carriers contribute to the noise current, while only minority carriers contribute to the signal current. This excess noise factor is a function of the minority carrier amplification (signal gain) and the ionization ratio of majority to minority carriers. For p-type collection regions (typical of silicon and InGaAs APDs) the minority carriers are electrons and the excess noise can be described by:

$$F_e \approx k_{eff} \cdot M_e + \left(2 - \frac{1}{M_e}\right)(1 - k_{eff}) \qquad [1]$$

where $F_e$ is the excess noise for injected electrons, $M_e$ is the electron amplification, and $k_{eff}$ is the weighted ratio of ionization coefficients of holes to electrons.

Similarly for n-type collection regions (typical of germanium and n-on-p HgCdTe), the excess noise can be described by:

$$F_h \approx k_{eff} \cdot M_h + \left(2 - \frac{1}{M_h}\right)(1 - k_{eff}) \quad [2]$$

where $F_h$ is the excess noise for injected holes, $M_h$ is the hole amplification, and $k_{eff}$ is the weighted ratio of ionization coefficients of electrons to holes.

The noise equivalent power (NEP) of a typical APD receiver circuit used in non-coherent or direct detection of an optical signal is given by:

$$NEP = \frac{\left[(\overline{I_{BN}^2} + \overline{I_{DN}^2})M^2 F + \overline{I_{PN}^2}\right]^{1/2}}{R_D M \eta_e} \quad [3]$$

where NEP is the receiver noise equivalent power, $(\overline{I_{BN}^2})^{1/2}$ is the unity-gain RMS Shot noise current due to DC background, $(\overline{I_{DN}^2})^{1/2}$ is the unity-gain RMS Shot noise current due to DC detector leakage current (dark current), $(\overline{I_{PN}^2})^{1/2}$ is the RMS Johnson or thermal noise current in the preamplifier, M is the minority carrier amplification (photodetector gain), F is the excess noise factor, $R_D$ is the unity-gain responsivity of the photodetector, and $\eta_e$ is the signal processing efficiency. For more descriptions see, for example, the following references, the teachings of which are incorporated herein by reference:

1. R. J. McIntyre, "Multiplication Noise in Uniform Avalanche Diodes," *IEEE Transactions on Electron Devices* ED-13(1), 164-168 (1966).
2. R. W. Byren, "Chapter 2, Laser Rangefinders," *The Infrared and Electro-Optical Systems Handbook, Volume 6*, J. Accetta and D. Shumaker exec. ed., C. Fox ed., Infrared Information Analysis Center and SPIE, pp. 90-92, 1993.

A normalized expression for the noise equivalent power as a function of the gain (minority carrier amplification) is given by:

$$\frac{NEP(M)}{NEP_{M=1}} = \frac{\left[(\overline{I_{AN}^2})M^2 F + (\overline{I_{UN}^2})\right]^{1/2}}{M} \quad [4]$$

where $$\frac{NEP(M)}{NEP_{M=1}}$$

is the relative receiver noise equivalent power normalized to unity gain value, $(\overline{I_{AN}^2})^{1/2}$ is the fraction of RMS unity gain noise current associated with noise sources that are amplified with detector avalanche multiplication, and $(\overline{I_{UN}^2})^{1/2}$ is the fraction of RMS unity gain noise current associated with noise sources that are not amplified with avalanche multiplication (note that $(\overline{I_{AN}^2}) + (\overline{I_{UN}^2}) = 1$).

FIG. 1 is a graph of the relative NEP as a function of gain M given a favorable ionization ratio of $k_{eff} = 0.1$ (typical of HgCdTe APD) for three different noise conditions: $(\overline{I_{AN}^2})^{1/2} = 0.01, 0.1, 0.5$ and 1.0. When the RMS noise current due to amplified sources (e.g., detector and background Shot noise) is small relative to the un-amplified sources (e.g., preamplifier thermal noise), the sensitivity is optimized (NEP minimized) at a high gain value ($M_{OPT} = 58.4$ for $(\overline{I_{AN}^2})^{1/2} = 0.01$). Conversely, when the receiver noise is dominated by the amplified noise sources (e.g., background noise limited), the NEP is optimized at unity gain. The significance of this analysis is that the optimal gain setting, which is determined by the reverse bias voltage of the APD, is a strong function of the prevalent noise condition for a given detector type. It would therefore be advantageous for the bias setting circuitry of an APD receiver to adjust its voltage setting based on the sensed noise condition.

Figure 2:
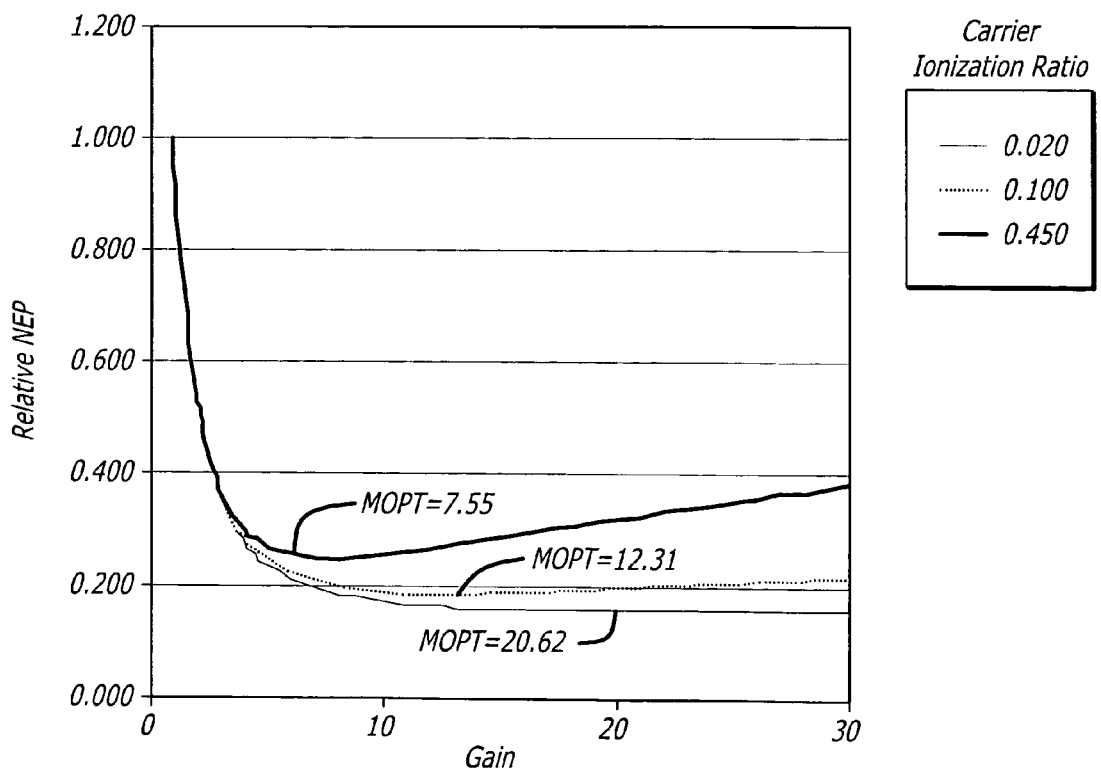
FIG. 2 is graph of relative noise equivalent power as a function of gain M for three different detector types given a specific noise condition.

For completeness, FIG. 2 is graph of the relative NEP as a function of gain M for three typical detector types (carrier ionization ratio $k_{eff} = 0.02, 0.1$, and 0.45) given a single representative RMS noise condition, where $(\overline{I_{AN}^2})^{1/2} = 0.1$. When the carrier ionization ratio is very low, the optimum APD gain is large ($M_{OPT} = 20.62$ for $k_{eff} = 0.02$), and conversely. The significance of this analysis is that the optimal gain setting is also strong function of the carrier ionization ratio, which is a property of the detector material. It would therefore be advantageous for the bias setting circuitry of an APD receiver to adjust its reverse-bias voltage setting correctly for different detector types.

The basic concept behind the inventive automatic APD bias setting system of the present teachings is to measure the total noise at the unity gain bias setting and then adjust the APD bias until the total noise is a predetermined factor, Z, greater than the unity gain noise. This approach offers the following advantages over prior APD bias setting approaches: It provides near-optimum NEP performance over a broad range of detector types and ambient noise conditions. It is simple to implement, and it may use the same circuitry employed in an automatic noise adaptive threshold setting function. It is robust relative to other noise sources that may enter the signal path through the APD bias circuit itself and electromagnetic interference (EMI) picked up on the signal path from the detector to the preamplifier. It is adaptable to the variability in photodiode performance from one diode to the next resulting from differences in the manufacturing process. And it is suitable for arrays of APDs where responsivities and leakage currents are well matched from one device to the next in an array.

The reference value, Z, of the ratio between the total noise current at the operating bias setting to the total noise current at unity gain, can be found for a particular detector type by calculating the optimum value of this ratio (i.e., the ratio giving the optimum gain) for a plurality of ambient noise conditions, selecting the maximum value, and then applying this reference value in the calculation of the gain setting for all noise conditions. This approach ensures that the gain setting is always equal to or greater than the optimum setting for each noise condition. This might be desirable due to the asymmetry in the NEP vs. gain curve (see FIG. 1 for example), wherein the NEP increases much more rapidly for values of the APD gain less than the optimum setting than for gain values greater than optimum. The reference ratio Z is a function of the detector type, more specifically, of the carrier impact ionization ratio $k_{eff}$ of the detector.

Table 1 shows illustrative calculations of gain, noise, and reference total noise ratio Z for a silicon APD type having a carrier ionization ratio of 0.02, demonstrating an illustrative method for computing the reference ratio Z for use with the present invention. For each of a plurality of noise conditions (amplified noise set to values between 0 and 1), the optimum gain, the excess noise factor at the optimum gain, and the total noise ratio (total noise current at optimum gain to total noise current at unity gain) are computed. The reference total noise ratio Z is then set to the maximum total noise ratio. In the example shown, the reference ratio Z is set to 3.730, which is the total noise ratio computed for an amplified noise of 0.261. Table 1 also shows the gain, excess noise factor, and NEP for each noise condition when operating at the reference total noise ratio Z, as well as the efficiency of the APD when operating at the reference ratio Z relative to the optimum gain. In all cases, the noise currents are normalized to the total unity gain noise and the NEP is normalized to the unity gain NEP value.

TABLE 1

| Amplified Noise | Optimum Gain | Excess Noise Factor at Optimum Gain | Total Noise Ratio at Optimum Gain | Reference Total Noise Ratio | Gain at Reference Total Noise Ratio | Excess Noise Factor at Set Gain | NEP at Set Gain | Efficiency Relative to Optimum |
|---|---|---|---|---|---|---|---|---|
| 0.001 | 464.1 | 11.24 | 1.8497 | 3.730 | 832.9 | 18.617 | 0.00448 | 88.98% |
| 0.01 | 99.8 | 3.95 | 2.221 | 3.730 | 158.70 | 5.128 | 0.02350 | 94.66% |
| 0.05 | 33.7 | 2.61 | 2.897 | 3.730 | 42.98 | 2.797 | 0.08679 | 99.06% |
| 0.1 | 20.7 | 2.33 | 3.312 | 3.730 | 23.29 | 2.384 | 0.16019 | 99.83% |
| 0.2 | 12.17 | 2.12 | 3.680 | 3.730 | 12.338 | 2.127 | 0.3023 | 100.00% |
| 0.261 | 9.64 | 2.05 | 3.730 | 3.730 | 9.639 | 2.051 | 0.3870 | 100.00% |
| 0.3 | 8.43 | 2.01 | 3.710 | 3.730 | 8.471 | 2.014 | 0.4404 | 100.00% |
| 0.4 | 6.10 | 1.921 | 3.501 | 3.730 | 6.492 | 1.939 | 0.5746 | 99.98% |
| 0.5 | 4.39 | 1.825 | 3.091 | 3.730 | 5.292 | 1.881 | 0.7049 | 99.81% |
| 0.6 | 3.05 | 1.700 | 2.516 | 3.730 | 4.487 | 1.831 | 0.8313 | 99.25% |
| 0.7 | 2.00 | 1.502 | 1.833 | 3.730 | 3.912 | 1.788 | 0.9536 | 97.67% |
| 0.8 | 1.119 | 1.107 | 1.117 | 3.730 | 3.481 | 1.748 | 1.0717 | 93.11% |
| 0.9 | 1.000 | 1.000 | 1.000 | 3.730 | 3.146 | 1.711 | 1.1855 | 84.35% |
| 1 | 1.000 | 1.000 | 1.000 | 3.730 | 2.880 | 1.677 | 1.2951 | 77.21% |

Similar analyses were performed for HgCdTe and InGaAs APDs and the reference total noise ratios were found the same way. Table 2 shows the calculated reference ratios for all three detector types.

TABLE 2

| Carrier Ionization Ratio ($k_{eff}$) | Detector Material | Calculated Reference Total Noise Ratio | Approximated Reference Total Noise Ratio |
|---|---|---|---|
| 0.02 | silicon | 3.730 | 3.730 |
| 0.1 | HgCdTe | 2.555 | 2.608 |
| 0.45 | InGaAs | 1.905 | 1.867 |

The reference total noise ratio, Z, can be approximated using the following equation:

$$Z = \frac{(\overline{I_{AN}^2})^{1/2}(M)}{(\overline{I_{AN}^2})^{1/2}_{M=1}} \approx (1.56299)(k_{eff})^{(-0.22236)} \quad [5]$$

The value of this approximation is shown in the last column of Table 2, showing it is in very good agreement with the calculated values.

Table 3 compares the efficiency of the inventive approach described above to the prior approach of Laughlin, listing the gain, normalized NEP, and efficiency relative to true optimum for a variety of detector types and ambient noise conditions. This approach provides a clear advantage in efficiency over Laughlin for all detector types and across the most prevalent range of ambient noise conditions. However, Laughlin does show somewhat better performance when the system approaches background or detector noise limited operation, i.e., $(\overline{I_{BN}^2})^{1/2}$ near unity, which is also where the fundamental advantage of an internal gain photodetector is least important.

TABLE 3

| $k_{eff}$ | Amplified Noise Fraction | Optimum | | Laughlin | | | Inventive | | |
|---|---|---|---|---|---|---|---|---|---|
| | | Opt. Gain | NEP (= MIN) | Set Gain | NEP | Gain Setting Efficiency | Set Gain | NEP | Gain Setting Efficiency |
| 0.02 | 0.01 | 99.83 | 0.02225 | 56.96 | 0.02483 | 88.4% | 158.70 | 0.02350 | 94.4% |
| | 0.05 | 33.69 | 0.08597 | 13.592 | 0.10392 | 79.1% | 42.98 | 0.08679 | 99.0% |
| | 0.1 | 20.71 | 0.15993 | 7.100 | 0.19819 | 76.1% | 23.29 | 0.16019 | 99.8% |
| | 0.2 | 12.17 | 0.3023 | 3.685 | 0.3761 | 75.6% | 12.338 | 0.3023 | 100.0% |
| | 0.4 | 6.095 | 0.5745 | 1.885 | 0.6877 | 80.3% | 6.492 | 0.5746 | 100.0% |
| | 0.6 | 3.049 | 0.8250 | 1.225 | 0.9235 | 88.1% | 4.487 | 0.8313 | 99.2% |
| 0.1 | 0.01 | 58.43 | 0.0325 | 41.18 | 0.03434 | 94.3% | 76.51 | 0.03339 | 97.2% |
| | 0.05 | 19.83 | 0.10900 | 11.736 | 0.12035 | 89.6% | 23.26 | 0.10983 | 99.2% |
| | 0.1 | 12.318 | 0.19003 | 6.538 | 0.2152 | 86.7% | 13.418 | 0.19038 | 99.8% |
| | 0.2 | 7.447 | 0.3380 | 3.552 | 0.3901 | 84.6% | 7.557 | 0.3380 | 100.0% |
| | 0.4 | 4.086 | 0.6070 | 1.868 | 0.6940 | 85.7% | 4.208 | 0.6071 | 100.0% |
| | 0.6 | 2.405 | 0.8429 | 1.224 | 0.9245 | 90.3% | 3.012 | 0.8482 | 99.4% |
| 0.45 | 0.01 | 35.41 | 0.04999 | 27.33 | 0.05173 | 96.5% | 38.02 | 0.05011 | 99.8% |
| | 0.05 | 12.070 | 0.15186 | 8.896 | 0.15877 | 95.5% | 12.538 | 0.15196 | 99.9% |
| | 0.1 | 7.552 | 0.2482 | 5.381 | 0.2615 | 94.6% | 7.675 | 0.2483 | 100.0% |
| | 0.2 | 4.657 | 0.4091 | 3.188 | 0.4347 | 93.7% | 4.657 | 0.4091 | 100.0% |
| | 0.4 | 2.715 | 0.6731 | 1.807 | 0.7175 | 93.4% | 2.829 | 0.6735 | 99.9% |
| | 0.6 | 1.788 | 0.8804 | 1.219 | 0.9284 | 94.6% | 2.143 | 0.8889 | 99.0% |

The method described above is an illustrative embodiment for predetermining the desired reference ratio of total noise at the operating APD bias to the total unity gain noise which represents the best mode for many APD receiver applications; however, other methods and algorithms may be used without departing from the spirit and scope of this invention.

In an alternative embodiment, the reference ratio is not selected to be the maximum of the optimized ratios across all noise conditions as taught above, but rather the reference ratio that minimizes the worst case deviation from the optimum across some selected range of noise conditions. This will result in a lower reference ratio and lower gain settings. The advantage is that the worst-case gain setting efficiency is higher. The disadvantage is that the operating point is less robust to variations in APD device characteristics and noise measurement errors. Noise measurement errors can be caused by poor calibration of the measurement circuitry (described later), inadequate statistical sampling of the noise current to confidently establish the mean value, or changing noise conditions within the response time of the gain setting process, which is approximately the reciprocal of the servo bandwidth.

In another embodiment, the reference ratio is calculated to be greater than that determined by either of the aforementioned embodiments by some fixed amount. The advantage is that the operating point is more robust to variations in device characteristics and noise measurement errors. The disadvantage is that the average gain-setting efficiency is somewhat lower. Other embodiments for determining the reference ratio may also be used without departing from the scope of the present teachings.

It should be noted that APD structures designed for high quantum efficiency near the band edge of the detector, such as silicon APDs designed for operation at 1064 nm, generally have a deep photon absorption region with low dopant-concentration. The silicon npπp APD structure is one example, where the π region represents a lightly doped p (acceptor) reach-through layer that must be fully depleted for proper photodetector operation. These structures often exhibit greater than unity gain at reverse bias voltages where the depletion region just penetrates the reach—through layer. For these devices, it is not practical to reference the total noise current to the unity gain value. It is therefore more prudent to set the operating bias such that the total noise current exceeds the reach-through noise current by a predetermined factor. This new Z factor is no longer a simple function of $k_{eff}$ but is dependent on the detector's planar structure and electric field profile at the reach-through voltage of the APD. For APDs with such a reach-through structure, the optimum value of Z can be determined by empirical measurements based on the present teachings.

In general, the reference ratio Z can be chosen to be the ratio between the noise at operating gain relative to the noise at any reference gain. In the preferred embodiment described above, the ratio Z is defined relative to unity gain or reach-through gain, when the amplified noise is much smaller than the unamplified noise. Other reference gains, however, can be used without departing from the scope of the present teachings.

Figure 3:
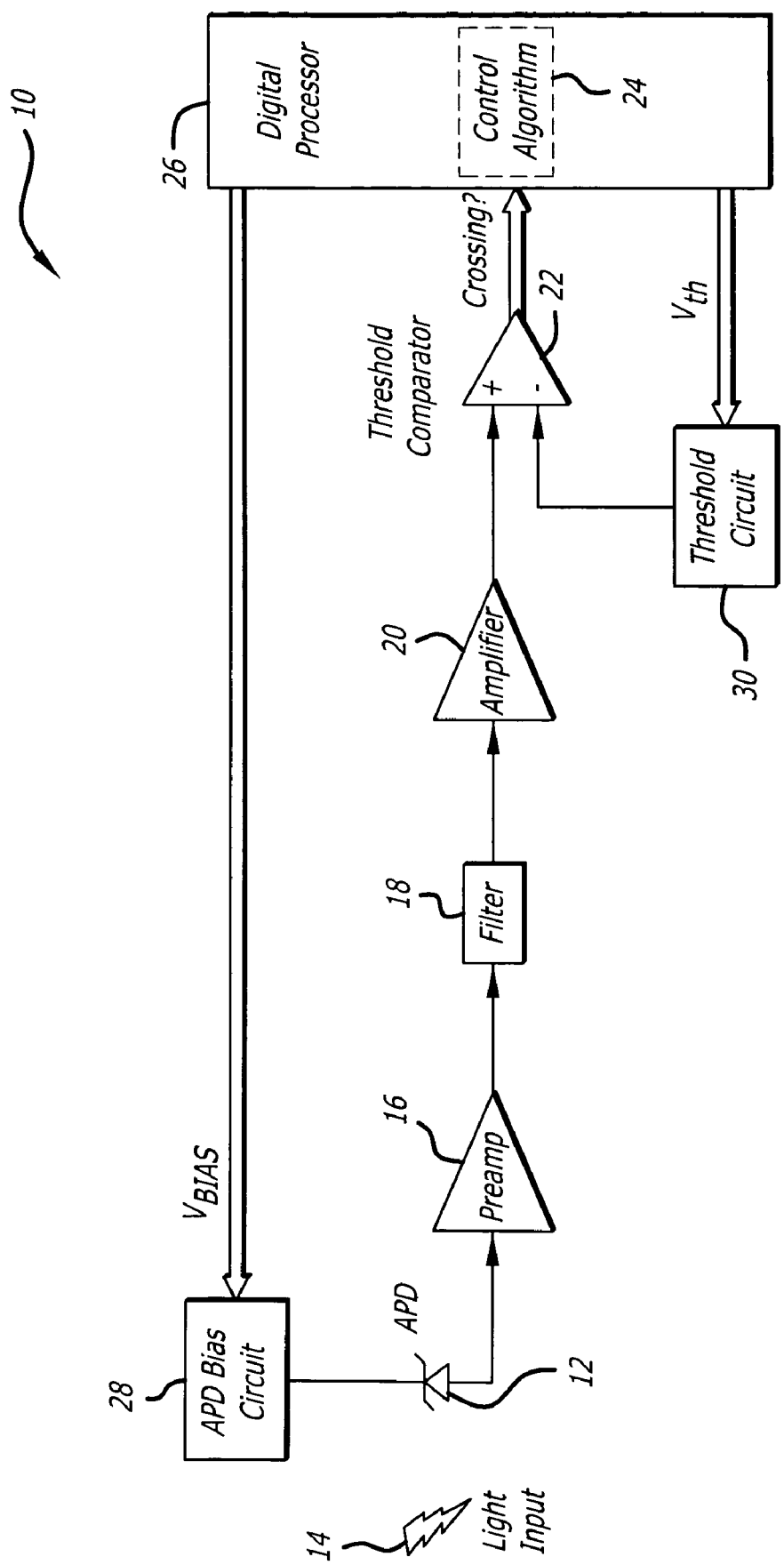
FIG. 3 is a simplified block diagram of an APD receiver system using an illustrative embodiment of the APD bias setting approach of the present invention.

FIG. 3 is a simplified block diagram of an APD receiver system 10 using an illustrative embodiment of the APD bias setting approach of the present invention. The receiver system 10 includes an APD 12 adapted to detect light input 14 and in response thereto generate an output signal that is sent to a preamplifier 16, which may be a very low noise transimpedance amplifier circuit. The pre-amplifier output may be then electronically filtered by a low-pass or bandpass filter 18 to reduce the noise while preserving adequate signal processing bandwidth for the APD signal. Additional stages of amplification (represented by amplifier 20) may also be used. The amplified output voltage is then input to the non-inverting input terminal of a voltage comparator 22 which registers a threshold crossing when the input voltage exceeds a threshold voltage value. A control system 24 including a novel APD bias setting algorithm, receives the comparator output and in accordance therewith generates digitized values representing a bias voltage and a threshold voltage, which are sent to a bias circuit 28 and threshold circuit 30, respectively. The bias circuit 28 converts the digitized bias value into a voltage and applies it to the cathode of the APD 12 (the anode of the APD 12 is coupled to the preamplifier 16). The threshold circuit 30 converts the digitized threshold value into a voltage and inputs it to the inverting input terminal of comparator 22. In the illustrative embodiment, the control system 24 is implemented in software as a control algorithm 24 stored in memory (not shown) and executed by a digital processor 26. However, other implementations, including discrete logic circuits, FPGAs, ASICs, etc., may be used without departing from the scope of the present teachings.

With this implementation, the APD bias function shares the same electronic hardware (the threshold setting circuitry) used by a noise-adaptive threshold function, which is typically included in many APD receiver circuits. The bias setting approach of the present invention can therefore be implemented without adding extra, complex circuitry.

Figure 4:
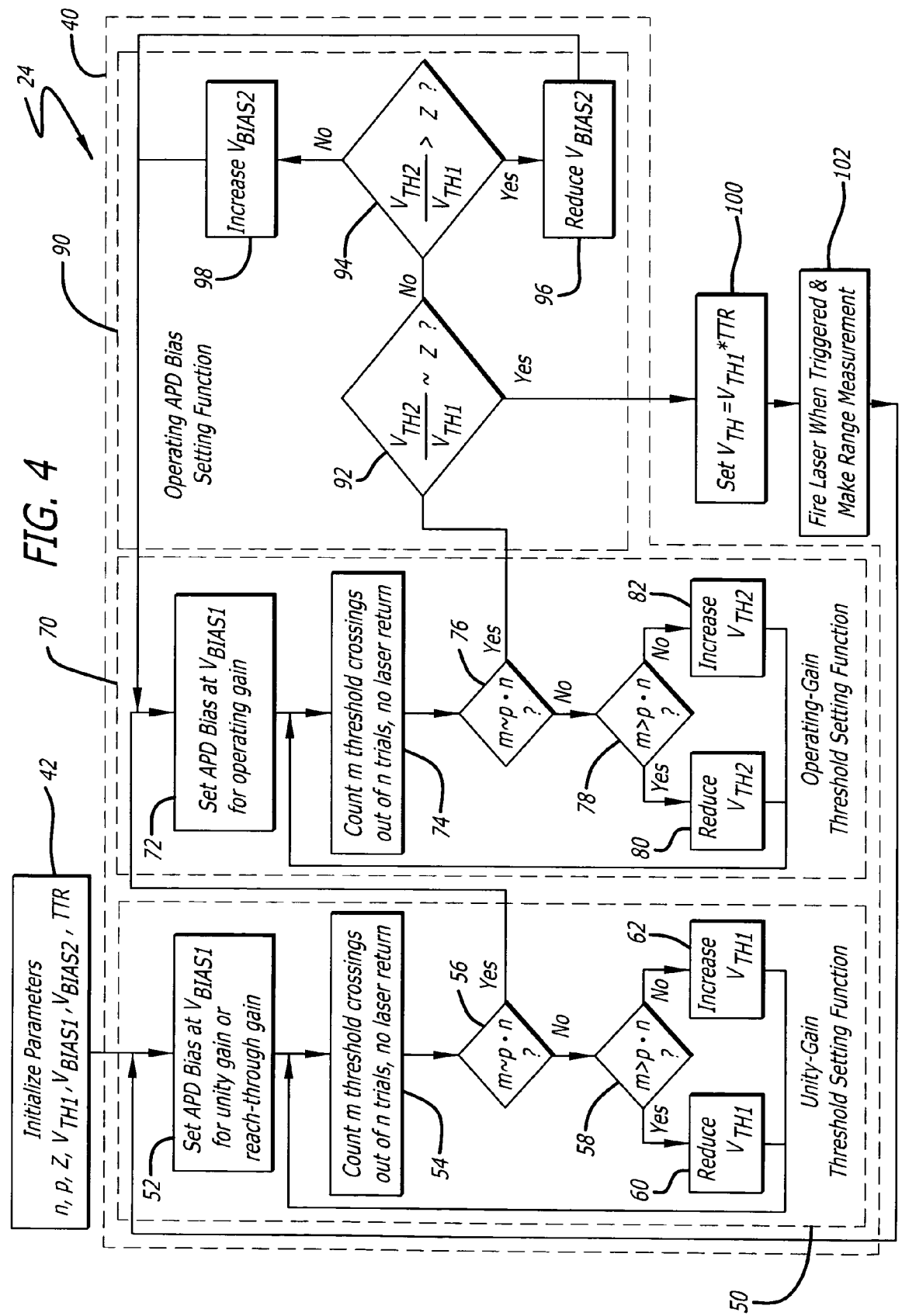
FIG. 4 is a flow diagram for an APD control algorithm using an illustrative embodiment of the APD bias setting approach of the present invention.

FIG. 4 is a flow diagram for an APD control algorithm 24 using an illustrative embodiment of the APD bias setting approach of the present invention, as well as a noise adaptive threshold process. In the illustrative embodiment, the APD receiver system is used in a laser range finding application, to detect the return signal from a fired laser. This embodiment is most appropriate for system applications in which the overall APD bias setting loop bandwidth (all functions shown in diagram) is high relative to the laser pulse repetition frequency, such that the inventive APD bias setting and noise adaptive threshold setting functions can be completed between laser firings.

In general, the novel bias setting algorithm 40 of the present invention includes the following steps: measuring the total noise at the unity gain bias setting (implemented in the illustrative embodiment by a unity-gain threshold setting function 50), measuring the total noise at an operating-gain bias setting (implemented by an operating-gain threshold setting function 70), and adjusting the operating-gain bias setting until a calculated ratio of the two noise measurements is equal to a predetermined factor Z (implemented by an operating APD bias setting function 90).

In an illustrative embodiment, the unity-gain threshold setting function 50 seeks to determine the comparator threshold setting $V_{TH1}$ that corresponds to a given probability of threshold crossing, p, at unity gain bias, $V_{BIAS1}$. For example, p=15.87% corresponds to the upper 1-sigma point of an assumed Gaussian probability density for the total noise. Other probability points may be used in accordance with the following (again assuming a Gaussian probability density):

$$p = 1/2 - 1/2 \cdot \text{ERF}\left(\frac{V_{TH1}}{\sqrt{2} \cdot \sigma}\right) \qquad [6]$$

where p is the reference probability of threshold crossing during n opportunities, $V_{TH1}$ is the threshold voltage corresponding to the reference probability of total noise at unity gain crossing threshold, σ is the RMS value of total noise voltage measured at the input to comparator, and ERF(x) is an error function given by:

$$\text{ERF}(x) = \frac{2}{\sqrt{\pi}} \int_0^x e^{-t^2} dt \qquad [7]$$

The reference probability, p, should be set well below 50% (as in the example) to avoid non-physical arguments for the error function. However, setting the reference probability too low will require a large value of n to ensure a stable noise sampling process, such that the measurement of m does not fluctuate greatly between different n-size samples. The first threshold setting is stored as $V_{TH1}$, thereby resetting the initial value.

Similarly, the operating-gain threshold setting function 70 seeks to determine a threshold setting $V_{TH2}$ for operating gain by raising the APD bias voltage to $V_{BIAS2}$ and adjusting the comparator threshold such that the probability of threshold crossing is again p. (A different probability point could be assumed without departing from the spirit and scope of this invention.) The initial value of $V_{BIAS2}$ is established based on worst-case device characteristics and temperature so that the device is biased safely away from the breakdown condition but reasonably near the anticipated operating point.

The operating APD bias setting function 90 then adjusts the bias voltage either up or down until the comparator threshold $V_{TH2}$ is nearly equal to the product of the unity gain threshold $V_{TH1}$ and the reference total noise ratio, Z. This is the desired operating point for the APD receiver. In a preferred embodiment, the bias voltage is adjusted in discrete steps such that the bias voltage is always equal to or greater than that required to give the optimum $V_{TH2}$. The bias voltage may also be adjusted continuously such that $V_{TH2}$ is more nearly optimum, but this requires additional sensing circuitry, the cost and complexity of which may not be justified relative to the improvement in APD receiver sensitivity.

In the illustrative embodiment of FIG. 4, the control algorithm 24 begins, at Step 42, by initializing several parameters to allow the bias setting and noise adaptive threshold functions to safely begin, without the APD being controlled into an unsafe breakdown condition. In the illustrative embodiment, the parameters include:

| | |
|---|---|
| n = | number of measurements used to establish threshold crossing statistics |
| m = | number of threshold crossings measured in n opportunities |
| p = | reference probability of threshold crossing during n opportunities |
| Z = | predetermined reference total noise ratio |
| $V_{TH1}$ = | threshold voltage corresponding to reference probability of total noise at unity gain crossing threshold |
| $V_{TH2}$ = | threshold voltage corresponding to reference probability of total noise at operational gain setting exceeding threshold |
| $V_{TH}$ = | threshold voltage at operational gain setting for constant false alarm rate |
| $V_{BIAS1}$ = | APD bias corresponding to unity gain (or reach-through gain depending on detector type and construction) |
| $V_{BIAS2}$ = | APD bias corresponding to operational gain setting |
| TTR = | predetermined ratio of the operating threshold voltage for a given constant false alarm rate to the threshold voltage corresponding to the reference probability of total noise at unity gain exceeding threshold ($V_{TH} = \text{TTR} \cdot V_{TH1}$) |

Then, the unity-gain threshold setting function 50 performs the following steps: At Step 52, set the APD bias value to VBIASI, for unity gain (or reach-through gain). At Step 54, measure the noise at unity gain by counting the number of threshold crossings m that occur in n number of trials (without any laser return). At Step 56, determine if m is approximately equal to the product of p and n. If yes, continue to Step 72 of the operating-gain threshold setting function 70; otherwise, at Step 58, determine if m is greater than the product of p and n. If yes, at Step 60, reduce $V_{TH1}$ and return to Step 54; if no, at Step 62, increase $V_{TH1}$ and return to Step 54.

Next, the operating-gain threshold setting function 70 performs the following steps: At Step 72, set the APD bias voltage to $V_{BIAS2}$, for operating gain. At Step 74, measure the noise at operating gain by counting the number of threshold crossings m that occur in n number of trials (without any laser return). At Step 76, determine if m is approximately equal to the product of p and n. If yes, continue to Step 92 of the operating APD bias setting function 90; otherwise, at Step 78, determine if m is greater than the product of p and n. If yes, at Step 80, reduce $V_{TH2}$ and return to Step 74; if no, at Step 82, increase $V_{TH2}$ and return to Step 74.

The operating APD bias setting function 90 then performs the following steps: At Step 92, determine if the ratio of $V_{TH2}$ to $V_{TH1}$ is approximately equal to the reference total noise ratio Z. If yes, the bias setting is complete and the control algorithm 24 can continue to the next function (in this example, a noise adaptive threshold function 100); otherwise, at Step 94, determine if the ratio of $V_{TH2}$ to $V_{TH1}$ is greater than the reference total noise ratio Z. If yes, at Step 96, reduce $V_{BIAS2}$ and return to Step 72; if no, at Step 98, increase $V_{BIAS2}$ and return to Step 72.

In the illustrative embodiment, after the bias setting algorithm 40 is complete, at Step 100, the comparator threshold voltage $V_{TH}$ is increased such that the new threshold is nearly equal to $V_{TH2}$ multiplied by the threshold-to-threshold ratio, TTR, which is pre-selected to give a desired false alarm rate. This noise adaptive threshold function 100 seeks to maintain a constant false alarm rate for the system across a broad range of ambient noise conditions. The TTR is a function of the value selected for p (the reference probability of threshold crossing in n opportunities) and the value of Z (the pre-selected reference total noise ratio). If the bias voltage is adjusted in discrete steps as discussed above, a larger value for the TTR may be desirable to accommodate the effect of a larger-than-optimal bias voltage setting when the optimal setting falls between steps.

The APD receiver 10 is then ready for operation. For a laser range finding application, at Step 102, fire the laser and make a range measurement. After the receiver 10 has completed a measurement, or after a predetermined amount of time (since the last bias setting calibration), the APD controller 24 may then return to Step 52 to begin recalibrating the APD bias setting.

Figure 5:
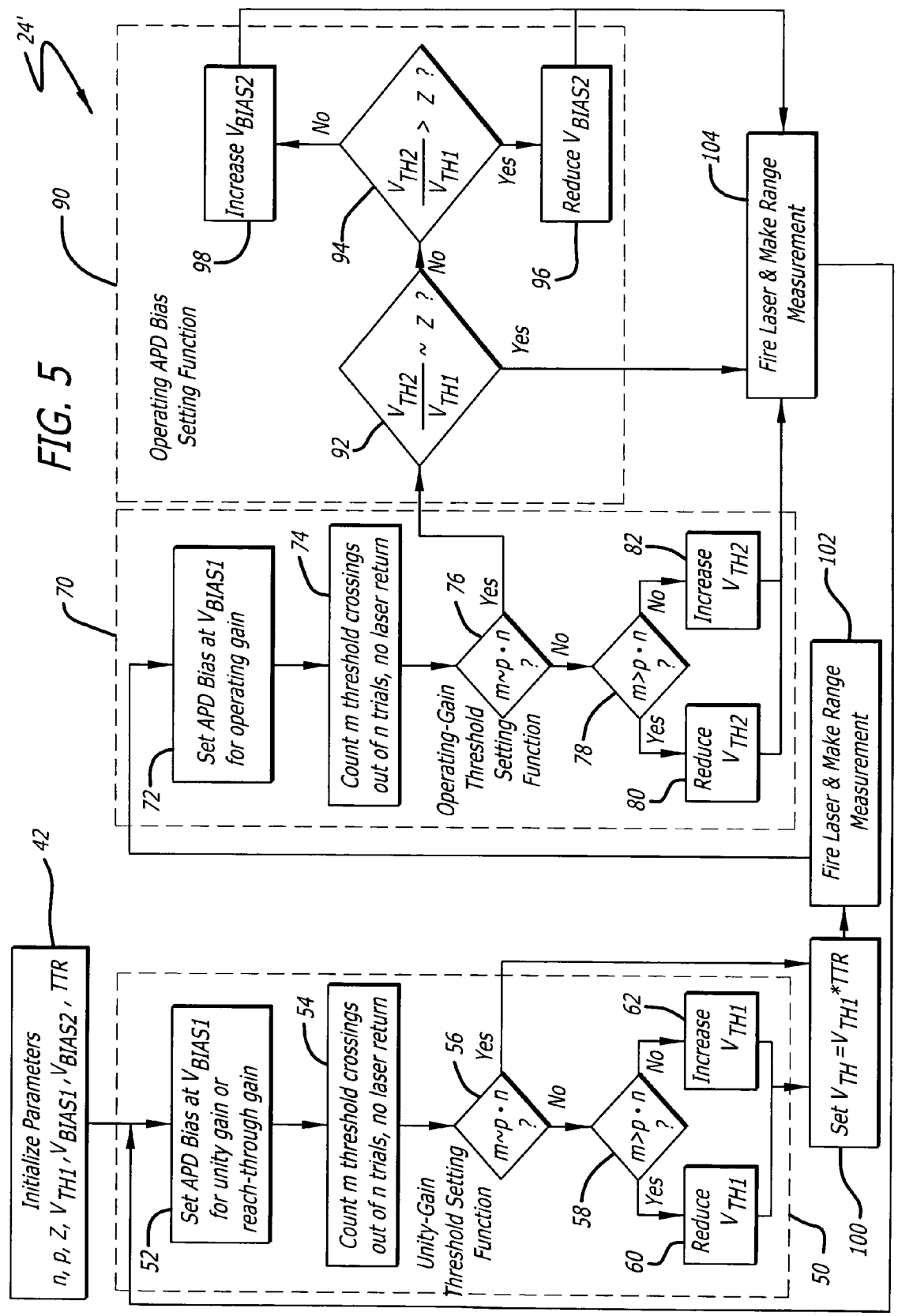
FIG. 5 is a flow diagram for an alternate APD control algorithm with an illustrative embodiment of the APD bias setting approach of the present invention.

FIG. 5 is a flow diagram for an alternate APD control algorithm 24' with an illustrative embodiment of the APD bias setting approach of the present invention. This embodiment is more appropriate when the overall APD bias setting loop bandwidth (all functions shown in diagram) is low relative to the laser pulse repetition frequency. The embodiment of FIG. 5 is identical to that of FIG. 4 except that the noise measurements (i.e., the counts of threshold crossings out of n trials) are made between adjacent laser firings.

The first n-trial measurement is performed by the unity-gain threshold setting function 50 and is used to establish the value of $V_{TH1}$. After the first measurement, if at Step 58, m exceeds the product of p and n, $V_{TH1}$ is reduced (Step 60) for the next round of measurements and the algorithm 24' continues to Step 100. Conversely, if it is less, $V_{TH1}$ is increased (Step 62) and the algorithm 24' continues to Step 100. If it is nearly equal, at Step 56, $V_{TH1}$ is left unchanged and the algorithm 24' continues to Step 100. At this point the threshold voltage is set for constant false alarm (Step 100), and the laser is fired (Step 102).

The second measurement is then performed by the operating-gain threshold setting function 70 to establish the value of $V_{TH2}$ in a manner similar to $V_{TH1}$. After Steps 80 and 82, instead of returning to Step 74 (as in the embodiment of FIG. 4), the algorithm 24' continues to Step 104 where the laser is fired. The algorithm 24' then returns to Step 52.

After $V_{TH2}$ is established (i.e., m is nearly equal to the product of p and n at Step 76), if at Step 94 $V_{TH2}$ is greater than the product of $V_{TH1}$ and Z, the operating APD bias ($V_{BIAS2}$) is reduced (Step 96) for the next round of measurements, and the algorithm 24' continues to Step 104. If it is less, the operating APD bias is increased (Step 98), and the algorithm 24' continues to Step 104. If (at Step 92) it is nearly equal, the operating APD bias is left unchanged and the algorithm 24' continues to Step 104. At Step 104, the laser is fired and the cycle is repeated (returning to Step 52).

Increasing and decreasing the threshold settings and bias setting may be performed using respective single voltage increments, or these functions may be performed using a proportional algorithm, in which the voltage change is proportional to the deviation from the desired setting. The latter approach should allow these threshold and bias setting functions to converge much more rapidly.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A system for setting a bias of a device comprising:
first means for determining a ratio between noise at an operating gain of said device and noise at a reference gain of said device-and
second means for adjusting said bias until said ratio is equal to a predetermined factor Z.

2. The invention of claim 1 wherein said reference gain is unity gain or reach-through gain.

3. The invention of claim 1 wherein said first means includes third means for measuring a first noise measurement at said reference gain.

4. The invention of claim 3 wherein said first means further includes fourth means for measuring a second noise measurement at said operating gain.

5. The invention of claim 4 wherein said second means includes means for comparing a ratio of said second noise measurement to said first noise measurement with said predetermined factor Z, and adjusting said bias in accordance with said comparison.

6. The invention of claim 4 wherein said third means includes means for setting said bias to a reference gain bias.

7. The invention of claim 6 wherein said third means further includes means for counting a number of times m an output of said device crosses a first threshold over a predetermined number of trials n.

8. The invention of claim 7 wherein said third means further includes means for adjusting said first threshold until said number m is approximately equal to a predetermined fraction p of said number n.

9. The invention of claim 8 wherein said fourth means includes means for setting said bias to an operating gain bias.

10. The invention of claim 9 wherein said fourth means further includes means for counting a number of times x an output of said device crosses a second threshold over a predetermined number of trials y.

11. The invention of claim 10 wherein said fourth means further includes means for adjusting said second threshold until said number x is approximately equal to a predetermined fraction of said number y.

12. The invention of claim 11 wherein said second means includes means for comparing a ratio of said second threshold to said first threshold with said predetermined factor Z, and adjusting said bias in accordance with said comparison.

13. The invention of claim 1 wherein said predetermined factor Z is a function of the device type.

14. The invention of claim 1 wherein said predetermined factor Z is a function of a carrier impact ionization ratio of the device.

15. The invention of claim 1 wherein said predetermined factor Z is selected to optimize a gain of the device over a broad range of noise conditions.

16. The invention of claim 1 wherein said predetermined factor Z is approximately equal to $Z=(1.56299)(k_{eff})^{(-0.22236)}$, where $k_{eff}$ is a carrier impact ionization ratio of said device.

17. The invention of claim 1 wherein said device is a photodiode.

18. The invention of claim 1 wherein said device is an avalanche photodiode.

19. A biasing circuit for a photodiode comprising:
a first system for measuring a first noise measurement at a reference gain;
a second system for measuring a second noise measurement at an operating gain; and
a third system for adjusting a bias of said photodiode until a ratio of said second noise measurement to said first noise measurement is equal to a predetermined factor Z.

20. The invention of claim 19 wherein said reference gain is unity gain or reach-through gain.

21. A method for setting a bias for an avalanche photodiode including the steps of:
measuring total noise at a reference gain bias setting;
measuring total noise at an operating gain bias setting; and
adjusting said bias until a ratio of said total noise at operating gain to said total noise at reference gain is equal to a predetermined factor Z.

22. The invention of claim 21 wherein said reference gain is unity gain or reach-through gain.

23. A method for determining a reference ratio Z of noise at an operating gain to noise at a reference gain, that optimizes gain for an avalanche photodiode over a broad range of noise conditions, including the steps of:
calculating an optimum value of a ratio of noise at an optimum operating gain to noise at said reference gain for a plurality of ambient noise conditions and
setting said reference ratio Z equal to a maximum of said optimum values.

* * * * *